United States Patent [19]

Wasser et al.

[11] 4,161,423
[45] Jul. 17, 1979

[54] USE OF A DISSOLVED CELLULOSE AS A DRY STRENGTH AGENT AND DRAINAGE AID FOR PAPER

[75] Inventors: Richard B. Wasser, Norwalk; John A. Sedlak, Stamford, both of Conn.

[73] Assignee: American Cyanamid Company, Stamford, Conn.

[21] Appl. No.: 842,207

[22] Filed: Oct. 14, 1977

Related U.S. Application Data

[63] Continuation-in-part of Ser. No. 680,266, Apr. 26, 1976, abandoned.

[51] Int. Cl.² .................... D21H 3/20; D21H 3/18
[52] U.S. Cl. ............................. 162/163; 162/176
[58] Field of Search ............. 162/176, 163, 79, 72, 162/81, DIG. 5

[56] References Cited

U.S. PATENT DOCUMENTS

| | | | |
|---|---|---|---|
| 1,376,353 | 4/1921 | Peabody | 162/177 |
| 1,406,410 | 2/1922 | Peabody | 162/176 |
| 1,771,461 | 7/1930 | Lilienfeld | 162/DIG. 5 |
| 1,781,668 | 11/1930 | Peabody et al. | 162/146 |
| 3,706,629 | 12/1972 | Moore et al. | 162/163 |

FOREIGN PATENT DOCUMENTS 899559 5/1972 Canada.
426009 3/1975 U.S.S.R. .................... 162/79

OTHER PUBLICATIONS

"Chemical & Engineering News" May 26, 1975 pp. 4–5.
ABIPC vol. 44, Abstract 5791 1973.

*Primary Examiner*—S. Leon Bashore
*Assistant Examiner*—William F. Smith
*Attorney, Agent, or Firm*—Bruce F. Jacobs

[57] ABSTRACT

Cellulose dissolved in a suitable solvent and added to an aqueous suspension of paper-making cellulose fibers provides paper of improved dry strength.

9 Claims, No Drawings

USE OF A DISSOLVED CELLULOSE AS A DRY STRENGTH AGENT AND DRAINAGE AID FOR PAPER

This invention relates to a process for preparing cellulosic paper of improved dry strength and for improving the drainage rate of an aqueous suspension of paper-making cellulose fibers in the paper-making process. More particularly, this invention relates to such a process wherein a solution of cellulose in a selected solvent is added to the aqueous suspension of paper-making cellulose fibers, is precipitated in said suspension, associates with the paper-making fibers in said suspension and is carried over into the resulting paper wherein it effects improvements in dry strength.

Paper-making cellulosic fibers in proper aqueous environment are anionic in nature. Water-soluble polymers of cationic nature are substantive to the anionic cellulose and can become attached thereto to impart improved dry strength to paper made therefrom. Alum, which is strongly cationic, is substantive to the anionic cellulose and can impart a cationic charge to the cellulose so that anionic polymers will also become attached to the cellulosic fibers and effect improvements in dry strength. In environments wherein spent pulping liquors are present, the anionic nature of such liquors are present, the anionic nature of such liquors interferes with the attachment of cationic and anionic polymers to the suspended paper-making cellulosic fibers with the result that improved dry strength in the paper formed is difficult to achieve and dry strength improvements diminish as the content of spent pulping liquor increases. For many paper applications, it is desirable to use aqueous suspensions of cellulosic fibers in which spent pulping liquors are present to make the paper used. Because of the presence of the spent pulping liquor in the aqueous suspension of paper-making cellulosic fibers and the difficulties of imparting improved dry strength under such conditions, there continues to exist the need for processes for improving the dry strength of cellulosic paper which are unaffected by the presence or absence of spent pulping liquors in the aqueous suspension of paper-making cellulosic fibers from which the paper is made. The provision for such a process would fulfill a long-felt need and constitute a notable advance in the art.

In accordance with the present invention, there is provided a process for providing a cellulosic paper of improved dry strength which comprises forming an aqueous suspension of paper-making cellulosic fibers; adding to the suspension under agitation an effective amount of a cellulose dissolved in a solvent selected from the group consisting of paraformaldehyde-dimethylsulfoxide, nitrogen dioxide-dimethylformamide, and cadoxen so as to provide a precipitated cellulose; maintaining the suspension under agitation until association of precipitated cellulose and said paper-making cellulosic fibers occurs; forming a web of said paper-making fibers and the associated precipitated cellulose; and drying the resulting web.

The process of the present invention provides a cellulosic paper of improved dry strength over similar paper prepared without additive and in preferred instances also provides improved drainage of the fibers during paper formation. The process is effective over a wide range of pH values and of spent pulping liquor contents. The effective amount of dissolved cellulose is small and thus economical because of the small addition of dissolved cellulose, the amount of cellulose solvent present in the suspension is insufficient to dissolve or swell the paper-making cellulosic fibers. Since the dissolved cellulose precipitates and becomes associated with the paper-making cellulose by physical means, the process does not depend upon ionic substantivity or alum usage.

In carrying out the process of the present invention, there is first prepared an aqueous suspension of paper-making cellulosic fibers in accordance with conventional procedures. Paper-making cellulosic fibers useful in the process of the present invention include, for example, bleached and unbleached kraft pulp, chemical pulp, semi-chemical pulp, groundwood pulp, as well as mixtures thereof. Preferred usage includes unbleached kraft fibers, semi-chemical pulps, and mixtures thereof. The various useful pulps may have spent pulping liquors associated therewith since the process of the present invention is effective in such presence.

After a suitable aqueous suspension of paper-making cellulosic fibers has been prepared as indicated, the process of the present invention requires addition of an effective amount of a dissolved cellulose thereto, the cellulose being dissolved in a solvent selected from paraformaldehyde-dimethylsulfoxide, nitrogen dioxide-dimethylformamide, and cadoxen.

Generally, an effective amount of dissolved cellulose to be added will be that amount which provides from about 0.01 to about 5.0 weight percent of precipitated cellulose based on the dry weight of the paper-making cellulosic fibers. The particular dissolved cellulose additives that are useful are more fully described herein below. The dissolved cellulose is added to the suspension with agitation so as to provide precipitated cellulose throughout the suspension. The dissolved cellulose may be added at any convenient point in the paper-making process at which other strengthening agents are conventionally added. In preferred embodiments the dissolved cellulose is added between the machine chest and the headbox.

Various types of cellulose may be used to prepare the solution of cellulose in the specified solvents. Suitable celluloses include, for example, groundwood, softwood, hardwood, cotton, flax, jute, alpha cellulose and regenerated cellulose. Both bleached and unbleached types are useful. Preferred types include cotton, alpha cellulose, bleached softwood kraft and bleached hardwood kraft. Typically, such types of cellulose have molecular weights of from 10,000 to 1,000,000. Generally, the molecular weight of the cellulose employed to prepare the cellulose solution will range from about 25,000 to 500,000, with the higher values being preferred.

A particularly effective dissolved cellulose is obtained by dissolving cotton cellulose or alpha cellulose in a mixture of dimethylsulfoxide and paraformaldehyde, as described in *Dimethyl Sulfoxide (Paraformaldehyde): A Nondegrading Solvent For Cellulose*, D. Johnson et al., Journal of Applied Polymer Science, Applied Polymer Symposia, No. 2, part III, 1976. Other solvents include a solution of nitrogen dioxide in dimethylformamide and cadmium oxide in aqueous ethylenediamine, the latter being commonly known as cadoxen.

Generally, the dissolved cellulose will be present in solution in a suitable solvent at a concentration of about 1 percent by weight. Generally higher concentrations are too viscous to use conveniently while lower concentrations unnecessarily involve more solvent. The useful concentration is that which provides a viscosity convenient for use and will vary with molecular weight of the dissolved cellulose. Specific procedures for preparing useful solutions of dissolved natural cellulose are given in examples which follow.

The particular amount of dissolved cellulose to be added to the aqueous suspension is, as indicated above, from about 0.01 to 5.0 weight percent based on the dry weight of fibers in suspension. Preferred amounts are generally in the range of about 0.05 and 1 weight percent, same basis. The amount of dissolved cellulose to be added will vary depending on the pulp employed in paper making, the extent of improvements desired, the nature of additional agents employed, and the like. In any event, the amount of dissolved cellulose to be added is an amount that is effective in providing the improvements desired.

After the dissolved cellulose is added to the aqueous suspension of paper-making cellulosic fibers, the resulting suspension is maintained under agitation at a temperature in the range of from about 10° C. to about 60° C. until the dissolved cellulose added is precipitated and associated with the paper-making cellulosic fibers. Generally, precipitation and association of the dissolved cellulose added will take place rapidly although not instantaneously. Therefore, sufficient time should be allowed for precipitation and association of the added dissolved cellulose. When the dissolved cellulose is preferably added slowly, such as over a two-minute time period, generally the suspension need only be agitated for an additional minute or less. If faster additions of the dissolved cellulose are made, longer times for maintaining the suspension under agitation, such as up to several minutes, are generally desirable. In instances when paraformaldehyde:dimethylsulfoxide is used as the solvent for the dissolved cellulose, the pH of the suspension should be at a value of 5.5 or higher to ensure rapid precipitation and association but when the other solvents for the dissolved cellulose are used such provision is not necessary. Without the provision for pH in the case of paraformaldehyde:dimethylsulfoxide, precipitation will occur but will require excessive time periods at pH values below about 5.5.

After the suspension has been maintained under agitation for a sufficient time to precipitate and associate the precipitated cellulose with the paper-making cellulosic fibers, the resulting suspension is formed into a web by conventional procedures and the web thus-formed is dried by conventional procedures, i.e., at 240° F. for about 1.5 minutes.

The process of the present invention is particularly effective in paper-making involving pulps containing varying levels of residual spent pulping liquors. For example, the process of the present invention is effectively carried out with spent black liquor from the Kraft pulping process or spent semi-chemical pulping liquors from the neutral sulfite semi-chemical or green liquor pulping processes. These spent liquors, containing anionic degraded lignins, interfere with anionic or cationic agents for dry strength or drainage. The process of the present invention gives improved results with cellulosic fibers in aqueous suspension independent of the spent pulping liquor solids content normally encountered. Improvement in dry strength and drainage has been achieved over a spent pulping liquor solids concentration range of from 0 to 25 weight percent based on the dry weight of the paper-making cellulosic fibers.

Although the process of the present invention is effective in providing dry strength and drainage improvements without the need for alum or other additives, such conventional additives may be added if desired.

The invention is more fully illustrated by the examples which follow wherein all parts and percentages are by weight unless otherwise specified.

EXAMPLE 1

The following illustrates the procedure for preparing a dissolved cellulose by the use of dimethyl sulfoxide and paraformaldehyde.

In a 250 ml. Erlenmeyer flask equipped with mechanical stirrer are placed 1.0 g. of cotton cellulose (Whatman No. 1 Qualitative filter paper) torn into approximately one-half inch square pieces, 100 ml. of dimethyl sulfoxide, and 2.5–5.0 g. of paraformaldehyde. The mixture, open to the atmosphere, is immersed in an oil bath at 130°–135° C. and is stirred for 5–15 minutes to effect dissolution of the cellulose. The solution is then diluted with dimethyl sulfoxide to bring the concentration to 0.1%, based on the dry weight of the cotton cellulose.

EXAMPLE 2

The following illustrates the procedure for preparing a dissolved cellulose by the use of nitrogen dioxide and dimethylformamide.

Nitrogen dioxide gas is slowly passed into 100 g. of dimethylformamide at room temperature so that the solution gains 3.0 g. in weight during a one-half hour period. The dark green solution is then placed in a 125 ml. Erlenmeyer flask equipped with mechanical stirring and 1.04 g. of cotton cellulose (Whatman No. 1 Qualitative filter paper) torn into approximately one-half inch squares is added. The mixture, open to the atmosphere, is stirred at room temperature for about two hours to effect dissolution of the cellulose. Before use, the solution is diluted to 0.1%, based on the dry weight of the cotton cellulose, with dimethylformamide.

EXAMPLE 3

The following illustrates the procedure for preparing a dissolved cellulose in a mixture of cadmium oxide and ethylenediamine. The mixture is generally known as cadoxen.

In a one-liter creased round-bottom flask equipped with mechanical stirrer and immersion thermometer are placed 252 g. of ethylenediamine (previously distilled at 116.0°–116.7° C.) and 648 g. of deionized water. The solution is vigorously stirred in an ice-water bath and 90.0 g. of powdered cadmium oxide is added during 40 minutes while maintaining the temperature at 1°–4° C. Stirring is continued for 24 hours at approximately 1° C. The mixture is allowed to warm to room temperature and the solids are separated by centrifuging. During storage in the refrigerator and at room temperature for several days, a precipitate forms and settles to the bottom; this is removed by decanting. Analysis of the solution by atomic absorption shows cadmium concentration to be 5.6% by volume.

To 729 g. of the solution is added 91 g. of 3.27 N sodium hydroxide in 28% ethylenediamine to give cadoxen containing 5.0% cadmium and 28% ethylenediamine, and 0.35 M in sodium hydroxide.

In a 250 ml. Erlenmeyer flask equipped with magnetic stirrer is placed 100 g. of cadoxen and 0.20 g. of cotton cellulose (Whatman No. 1 Qualitative filter paper) torn in approximately one-half inch square pieces. The flask is stoppered and the mixture is stirred at room temperature for 7¼ hours to effect almost complete dissolution of the cellulose. Before use, the solution is diluted with cadoxen to 0.1% based on the dry weight of the cotton cellulose.

EXAMPLE 4

The following illustrates the effect on dry strength and drainage of unbleached Kraft pulp from using different concentrations of a dissolved cellulose when added to pulp at 2.5% consistency.

Unbleached Kraft pulp is refined in a Valley beater to 510 ml. Canadian Standard Freeness at 2.5% consistency. To this pulp is added 200 ppm of $So_4^=$, using sodium sulfate, based on the total volume and 4.0 percent black liquor solids, based on the dry weight of the fiber, obtained as a 12.9% solution from the pulp washers of a Kraft pulp mill. The pH is lowered to 9 using dilute sulfuric acid and then 0.75% alum is added based on the dry weight of the fiber and the pH adjusted to 6.5.

To simulate recycled white water, dilution water is prepared by adding 200 ppm $SO_4^=$, using sodium sulfate, and enough black liquor to bring the black liquor solids concentration to 1.33 g/l. The pH is then adjusted to 6.5 with dilute sulfuric acid.

To an 800 g. batch of 2.5% pulp while stirring, a dissolved cellulose solution prepared by the procedure of Example 1 is added over a 2 minute period in the amounts indicated in the table which follows. Stirring is continued for one minute after the dissolved cellulose addition is complete. During addition of the dissolved cellulose and subsequent stirring the dissolved cellulose precipitates and associates with the suspended cellulosic fibers. The pulp is then diluted to 0.5% consistency using the prepared dilution water, bringing the total black liquor solids concentration to 25%, based on the dry weight of cellulosic fiber. The pulp is then stirred one additional minute.

The pulp is then divided into aliquots. One freeness determination and three 5.5 g. handsheets are made using a Noble & Wood handsheet machine. The freeness measurement is made with 1 liter of 0.5% consistency pulp using a Canadian Standard Freeness Tester. This measurement is identical to TAPPI standard T227 except 0.5% consistency pulp is used instead of 0.3%. Dilution water for the sheet mold of the handsheet machine contains 200 ppm $SO_4^=$, using sodium sulfate. The handsheets are wet pressed using 1½ weights and drum dried at 240° F. for 1½ minutes. The handsheets are then conditioned at 73° F. and 50% relative humidity.

The results are as follows:

| Sample | Dissolved Cellulose Added[1] | Freeness[2] | Scott Internal Bond[3] | Mullen Burst[4] |
|---|---|---|---|---|
| 1a | Blank[5] | 530 | .078 | 68.8 |
| b | Blank[6] | 470 | .061 | 72.8 |
| 2 | 0.1 | 490 | .084 | 74.0 |
| 3 | 0.2 | 555 | .110 | 74.9 |
| 4 | 0.3 | 575 | .142 | 71.7 |
| 5 | 0.5 | 615 | .196 | 69.4 |

[1] %, based on the dry weight of the fiber.
[2] ml., TAPPI Standard T227 except 0.5% consistency instead of 0.3%
[3] ft-lb/in.$^2$
[4] psi, TAPI Standard T403
[5] Sample 1a Blank refers to Samples 4 and 5
[6] Sample 1b Blank refers to Samples 2 and 3

EXAMPLE 5

The following example illustrates the use of a dissolved cellulose when added to a pulp at a consistency of 0.5%. This is typical of the consistency found in a paper mill after the fan pump and prior to forming the sheet. A black liquor solids concentration of 25% based on dry fiber weight was used which is representative of a mill that has poorly washed pulp.

The procedure of Example 4 is repeated except the dissolved cellulose is added to the pulp after it is diluted to 0.5% consistency. The dilution water contains 1.33 g/l black liquor solids and 200 ppm $SO_4^=$. The additional black liquor brings the total black liquor concentration relative to the dry fiber weight to 25%.

Results are as follows:

| Sample | Dissolved Cellulose Added[1] | Freeness[2] | Scott Internal Bond[3] | BUrst[4] |
|---|---|---|---|---|
| 1 | Blank | 495 | .072 | 75.5 |
| 2 | 0.1 | 510 | .113 | 80.4 |
| 3 | 0.2 | 520 | .126 | 90.1 |
| 4 | 0.3 | 535 | .127 | 86.7 |
| 5 | 0.5 | 575 | .168 | 85.8 |

[1] %, based on the dry weight of the fiber.
[2] ml., TAPPI Standard T227 except 0.5$ consistency instead of 0.3%
[3] ft-lb/in.$^2$
[4] psi, TAPPI Standard T403

EXAMPLE 6

The following illustrates the effect on dry strength and drainage from using different concentrations of black liquor solids.

The procedure of Example 4 is repeated except the dissolved cellulose is added to the pulp after it is diluted to 0.5% consistency. The black liquor and the alum are added and the pH is adjusted for each individual batch just prior to the addition of the dissolved cellulose.

Results are as follows:

| Sample | Black liquor Solids Added[1] | Dissolved Cellulose Added | Freeness[2] | Scott Internal Bond[3] | Mullen Burst[4] |
|---|---|---|---|---|---|
| 1a | 0 | 0 | 465 | .073 | 78.5 |
| b | 0 | 0.25 | 535 | .115 | 93.5 |
| 2a | 5 | 0 | 500 | .063 | 75.7 |
| b | 5 | 0.25 | 540 | .120 | 93.4 |
| 3a | 10 | 0 | 485 | .064 | 73.8 |
| b | 10 | 0.25 | 550 | .149 | 94.0 |
| 4a | 15 | 0 | 495 | .079 | 76.0 |
| b | 15 | 0.25 | 555 | .112 | 94.7 |
| 5a | 20 | 0 | 495 | .074 | 75.4 |
| b | 20 | 0.25 | 555 | .163 | 89.8 |
| 6a | 25 | 0 | 480 | .090 | 76.8 |

-continued

| Sample | Black liquor Solids Added[1] | Dissolved Cellulose Added | Freeness[2] | Scott Internal Bond[3] | Mullen Burst[4] |
|---|---|---|---|---|---|
| b | 25 | 0.25 | 525 | .137 | 91.7 |

[1]%, based on the dry weight of the fiber
[2]ml., TAPPI Standard T227 except 0.5% consistency instead of 0.3%.
[3]ft-lb/in.[2]
[4]psi, TAPPI Standard T403

EXAMPLE 7

The following illustrates the effect of using alpha cellulose as the source of a dissolved cellulose solution.

The procedure of Example 4 is repeated except the dissolved cellulose is prepared from alpha cellulose.

Results are as follows:

| Sample | Amount of Dissolved Cellulose Added[1] | Freeness[2] | Scott Internal Bond[3] | Mullen Burst[4] |
|---|---|---|---|---|
| 1 | Blank | 470 | .061 | 72.8 |
| 2 | 0.1 | 475 | .063 | 74.7 |
| 3 | 0.2 | 520 | .089 | 81.7 |
| 4 | 0.3 | 540 | .102 | 82.3 |

[1]%, based on the dry weight of the fiber.
[2]ml., TAPPI Standard T227 except 0.5% consistency instead of 0.3%
[3]ft-lb/in.[2]
[4]psi, TAPPI Standard T403

EXAMPLE 8

The following illustrates the use of a dissolved cellulose solution to improve the drainage and flat crush resistance of corrugating medium.

Commercial corrugating medium made from a semichemical and unbleached Kraft furnish is repulped in a Valley beater and refined at 2.9% consistency to 180 ml. Canadian Standard Freeness. Enough spent pulping liquor from the semi-chemical pulping process is added to the pulp to bring the spent liquor solids concentration to 3 g. per liter, which is equivalent to 12% spent liquor solids based on the dry weight of the fiber. The pH is then adjusted to 8.5.

Batches of this pulp are then diluted to 0.5% consistency with demineralized water containing 200 ppm $SO_4^=$, using sodium sulfate. The sodium sulfate is added to simulate the dissolved electrolytes normally found in corrugating medium mill process water.

The pH of each batch is then adjusted as described in the table below. A dissolved cellulose solution prepared by the procedure of Example 1 is then added as a 0.1% solution to the pulp and mixed for one minute.

Handsheets and freeness measurements are made according to the procedure described in Example 4. The handsheets are conditioned and tested for basis weight and corrugated medium test (CMT) according to the TAPPI Standard Procedure T809su-66.

Results are as follows:

| Sample | Dissolved Cellulose Added[1] | pH of Pulp | Freeness[2] | Corrugated Medium Test[3] |
|---|---|---|---|---|
| 1 | Blank | 4.0 | 310 | 47.0 |
| 2 | 0.3 | 4.0 | 315 | 55.3 |
| 3 | 0.3 | 5.0 | 290 | 56.6 |
| 4 | 0.3 | 6.0 | 260 | 59.3 |
| 5 | 0.3 | 7.0 | 510 | 65.8 |
| 6 | 0.3 | 8.0 | 475 | 45.8 |
| 7 | 0.3 | 8.5 | 480 | 49.1 |
| 8 | Blank | 8.5 | 250 | 45.9 |

[1]%, based on the dry weight of the fiber.
[2]ml.
[3]lb., TAPPI Standard Procedure T809su-66.

EXAMPLE 9

The following illustrates the effect on dry strength and drainage using wood pulp as the source for the dissolved cellulose.

The procedure of Example 4 is repeated except the dissolved cellulose is prepared from the wood pulps listed below.

Results are as follows:

| Type of Cellulose Dissolved | Dissolved Cellulose Added[1] | Freeness[2] | Scott Internal Bond[3] | Mullen Burst[4] |
|---|---|---|---|---|
| Blank | 0 | 465 | .067 | 70.5 |
| Bleached Southern Pine | 0.1 | 485 | .072 | 78.3 |
|  | 0.2 | 500 | .082 | 74.3 |
| Kraft | 0.3 | 525 | .083 | 81.5 |
| Bleached Southern | 0.1 | 465 | .057 | 73.5 |
|  | 0.2 | 485 | .060 | 73.8 |
| Hardwood Kraft | 0.3 | 500 | .080 | 75.5 |
| Bleached Paper | 0.1 | 480 | .075 | 72.1 |
|  | 0.2 | 515 | .085 | 78.0 |
| Towel[5] | 0.3 | 540 | .087 | 80.3 |

[1]%, based on the dry weight of the fiber.
[2]ml., TAPPI Standard T227 except 0.5% consistency instead of 0.3%.
[3]ft-lb/in.[2]
[4]psi, TAPPI Standard T403
[5]Marathon Kompact® No. 836, Marathon Paper Co.

EXAMPLE 10

The following illustrates the effect on dry strength and drainage of a dissolved cellulose obtained by dissolving cotton cellulose in a mixture of dimethylformamide and nitrogen dioxide.

The procedure of Example 4 is repeated except the dissolved cellulose is prepared by the procedure of Example 2. Enough black liquor is added to the pulp to bring the total black liquor solids concentration to 17% based on the dry weight of the cellulosic fibers. The pH is readjusted to 6.5 after the addition of the dissolved cellulose.

Results are as follows:

| Sample | Dissolved Cellulose Added[1] | Freeness[2] | Scott Internal Bond[3] | Mullen Burst[4] |
|---|---|---|---|---|
| 1 | 0 | 450 | .081 | 64.4 |
| 2 | 0.3 | 520 | .132 | 70.5 |

[1]%, based on the dry weight of the fiber.
[2]ml., TAPPI Standard T227 except 0.5% consistency instead of 0.3%.
[3]ft-lb/in.[2]
[4]psi, TAPPI Standard T403

EXAMPLE 11

The following illustrates the effect on dry strength and drainage of a dissolved cellulose obtained by dissolving cotton cellulose in a mixture of cadmium oxide and ethylenediamine. This mixture is generally known in the art as cadoxen.

The procedure of Example 4 is repeated except the dissolved cellulose is prepared by the procedures of Example 3. Concurrent with the addition of the dissolved cellulose, a 50% $H_2SO_4$ solution is added to maintain the pH at 6.5.

Results are as follows:

| Sample | Dissolved Cellulose Added[1] | Freeness[2] | Scott Internal Bond[3] | Mullen Burst[4] |
|---|---|---|---|---|
| 1 | Blank | 465 | .086 | 80.6 |
| 2 | 0.2 | 460 | .120 | 83.5 |
| 3 | 0.3 | 420 | .104 | 89.5 |

[1]%, based on the dry weight of the fiber.
[2]ml., TAPPI Standard T227 except 0.5% consistency instead of 0.3%
[3]ft-lb/in.
[4]psi, TAPPI Standard T403

EXAMPLE 12

The following illustrates the viscosities of different types of dissolved cellulose in a mixture of dimethyl sulfoxide and formaldehyde.

The procedure of Example 1 is repeated. The solution is then diluted with dimethyl sulfoxide to 0.1% cellulose by weight. A 20 ml. sample at 25° C. is then measured for viscosity. A Brookfield Model LVT viscometer with ultra low adaptor at 30 rpm is used.

Results are as follows:

| Type of Dissolved Cellulose | Viscosity, cps |
|---|---|
| cotton cellulose | 12.7 |
| alpha cellulose | 6.1 |
| bleached southern pine kraft | 4.2 |
| bleached southern hardwood kraft | 3.0 |
| bleached paper towel[1] | 6.1 |

[1]Marathon Kompact ® No. 836, Marathon Paper Co.

EXAMPLE 13

The following illustrates the effect of dissolved cellulose on bleached cellulosic paper fibers.

Bleached cellulosic paper fibers are prepared from a 50/50 blend of a softwood southern pine kraft and a hardwood southern kraft by beating the pulps separately in a Valley beater to about 500 ml. Canadian Standard Freeness, and then blending them together. The pulp blend is diluted with demineralized water to 0.5% consistency. Aliquots are taken and adjusted to the pH shown in the table below, and then 0.3% dissolved cellulose based on the dry fiber weight is added as a 0.1% solution. The dissolved cellulose is prepared according to Example 1. One freeness and three 5.5 g. handsheets are prepared according to Example 4.

Results are as follows:

| Sample | Dissolved Cellulose Added[1] | pH of pulp | Freeness[2] | Scott Internal Bond[3] | Mullen Burst[4] |
|---|---|---|---|---|---|
| 1 | blank | 4 | 440 | .054 | 66.6 |
| 2 | 0.3 | 4 | 420 | .055 | 65.5 |
| 3 | 0.3 | 5 | 365 | .063 | 72.7 |
| 4 | 0.3 | 6 | 365 | .064 | 68.7 |
| 5 | 0.3 | 7 | 540 | .119 | 71.6 |
| 6 | 0.3 | 8 | 545 | .100 | 70.7 |
| 7 | blank | 8 | 390 | .055 | 70.0 |

[1]%, based on the dry weight of the fiber.
[2]ml., TAPPI Standard T227 except 0.5% consistency instead of 0.3%
[3]ft-lb/in.[2]
[4]psi, TAPPI Standard T403

COMPARATIVE EXAMPLE A

To substantiate the fact that the effective agent in the process of the present invention is cellulose precipitated from the dissolved cellulose added and not the cellulose solvent, the following experiments were run.

A large quantity of the solvent used to prepare the dissolved cellulose used in Example 5 was prepared as follows: To a flask equipped with a mechanical stirrer were added 1000 grams of dimethyl sulfoxide and 5 grams of paraformaldehyde. The mixture, open to the atmosphere, was immersed in an oil bath at 130°–135° C. and stirred for 15 minutes. A solution resulted containing only a very slight amount of undissolved solids.

The procedure of Example 5 was then followed except that in place of the quantity of dissolved cellulose solution added in each sample of Example 5 to the pulp suspension, there was added a like quantity of the solvent alone as prepared above.

Results were as follows:

| Sample | Dimethyl Sulfoxide: Paraformaldehyde Added[1] | Freeness[2] | Scott Internal Bond[3] | Burst[4] |
|---|---|---|---|---|
| 1 | Blank | 500 | 0.076 | 74.6 |
| 2 | 22 | 485 | 0.083 | 79.6 |
| 3 | 44 | 505 | 0.086 | 78.3 |
| 4 | 66 | 505 | 0.078 | 77.8 |
| 5 | 110 | 505 | 0.075 | 74.7 |

Notes:
[1]ml; volume is equal to that added for the same sample number in Example 5.
[2]ml; TAPPI Standard T227 except 0.5% consistency instead of 0.3%.
[3]ft. lb./in[2].
[4]psi, TAPPI Standard T403.

We claim:

1. A process for providing a cellulosic paper of improved dry strength which comprises forming an aqueous suspension of paper-making cellulosic fibers; adding to said suspension about 0.05 to 1 weight percent based on the dry weight of said fibers of a cellulose dissolved in a solvent selected from the group consisting of paraformaldehyde-dimethylsulfoxide, nitrogen dioxide-dimethyl formamide and cadmium oxide-ethylenediamine so as to provide a precipitated cellulose; maintaining the suspension under agitation until association of the precipitated cellulose and said paper-making cellulosic fibers occurs; forming a web of said paper-making fibers and the associated precipitated cellulose; and drying the resulting web.

2. The process of claim 1 wherein the cellulose is dissolved in a solution of paraformaldehyde-dimethyl sulfoxide.

3. The process of claim 1 wherein the dissolved cellulose is cotton.

4. The process of claim 2 wherein the dissolved cellulose is cotton.

5. The process of claim 1 wherein spent pulping liquor solids are present in said aqueous suspension of paper-making cellulosic fibers.

6. The process of claim 1 wherein said paper-making cellulosic fibers are unbleached Kraft pulp.

7. The process of claim 6 wherein black liquor solids are present in said aqueous suspension of paper-making cellulosic fibers.

8. The process of claim 1 wherein said paper-making cellulosic fibers are a corrugating medium furnish.

9. The process of claim 1 wherein said paper-making cellulosic fibers are bleached cellulosic fibers of a blend of softwood/hardwood Kraft.

* * * * *